Dec. 31, 1957  N. H. KENT  2,818,225
POWER PLANT INSTALLATIONS FOR AIRCRAFT
Filed March 15, 1954  4 Sheets-Sheet 1
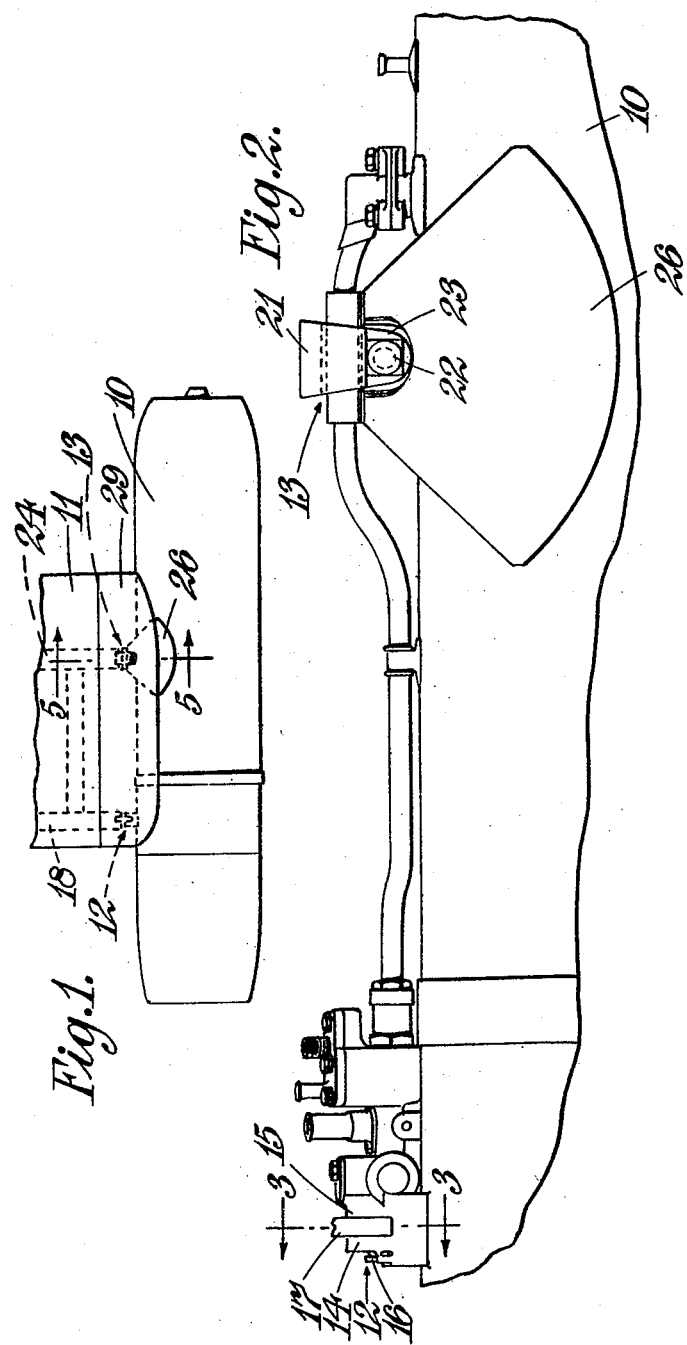

Dec. 31, 1957 N. H. KENT 2,818,225
POWER PLANT INSTALLATIONS FOR AIRCRAFT
Filed March 15, 1954 4 Sheets-Sheet 2
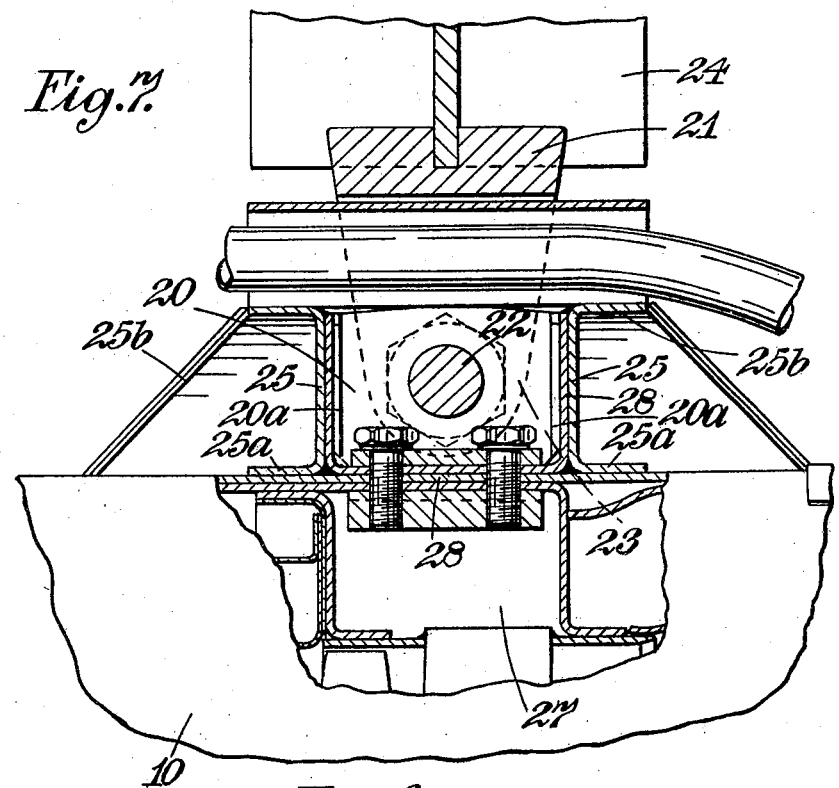
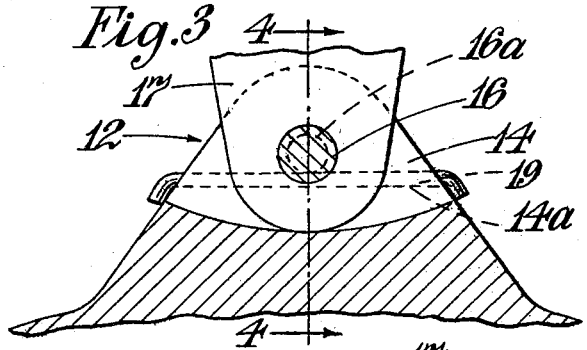
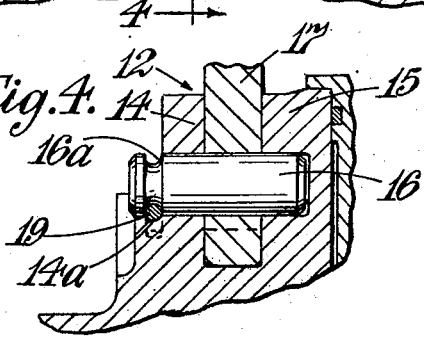

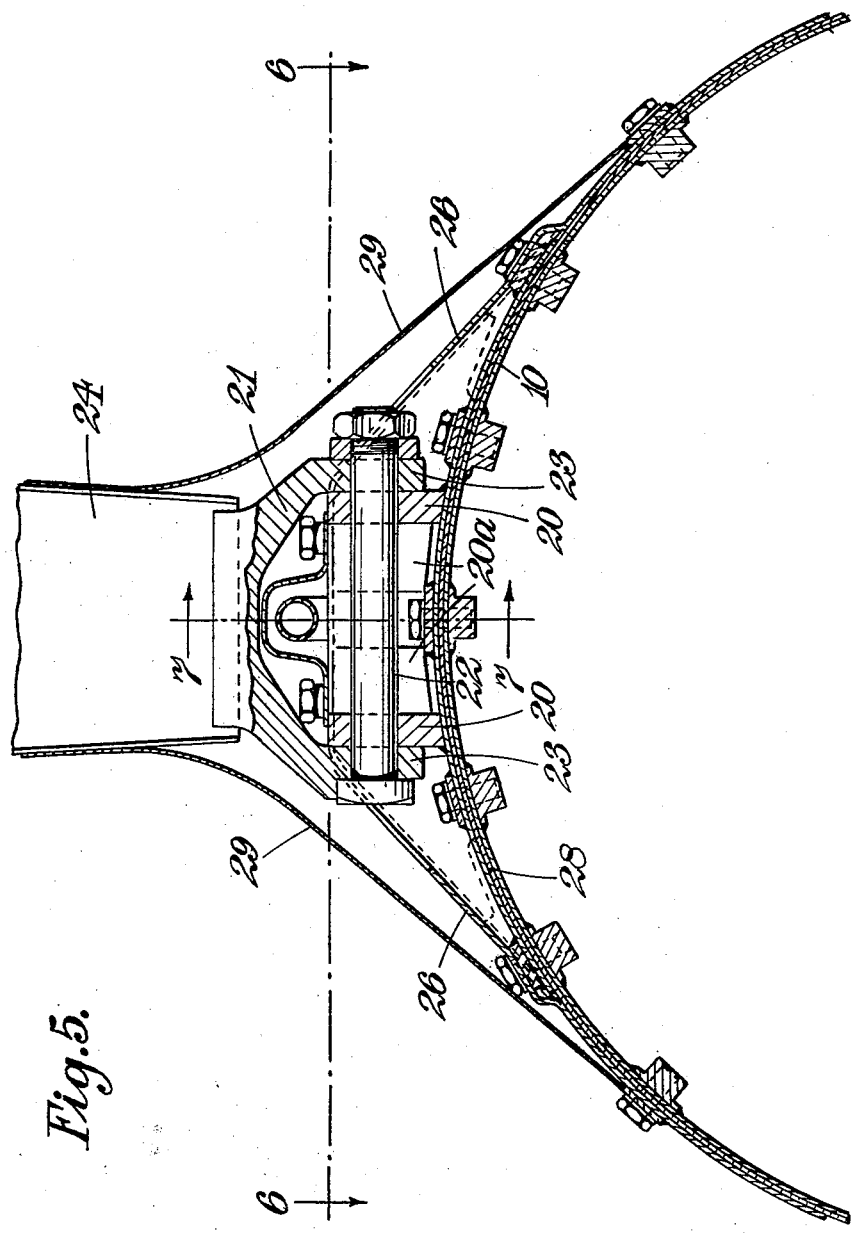

Dec. 31, 1957  N. H. KENT  2,818,225
POWER PLANT INSTALLATIONS FOR AIRCRAFT
Filed March 15, 1954  4 Sheets-Sheet 4
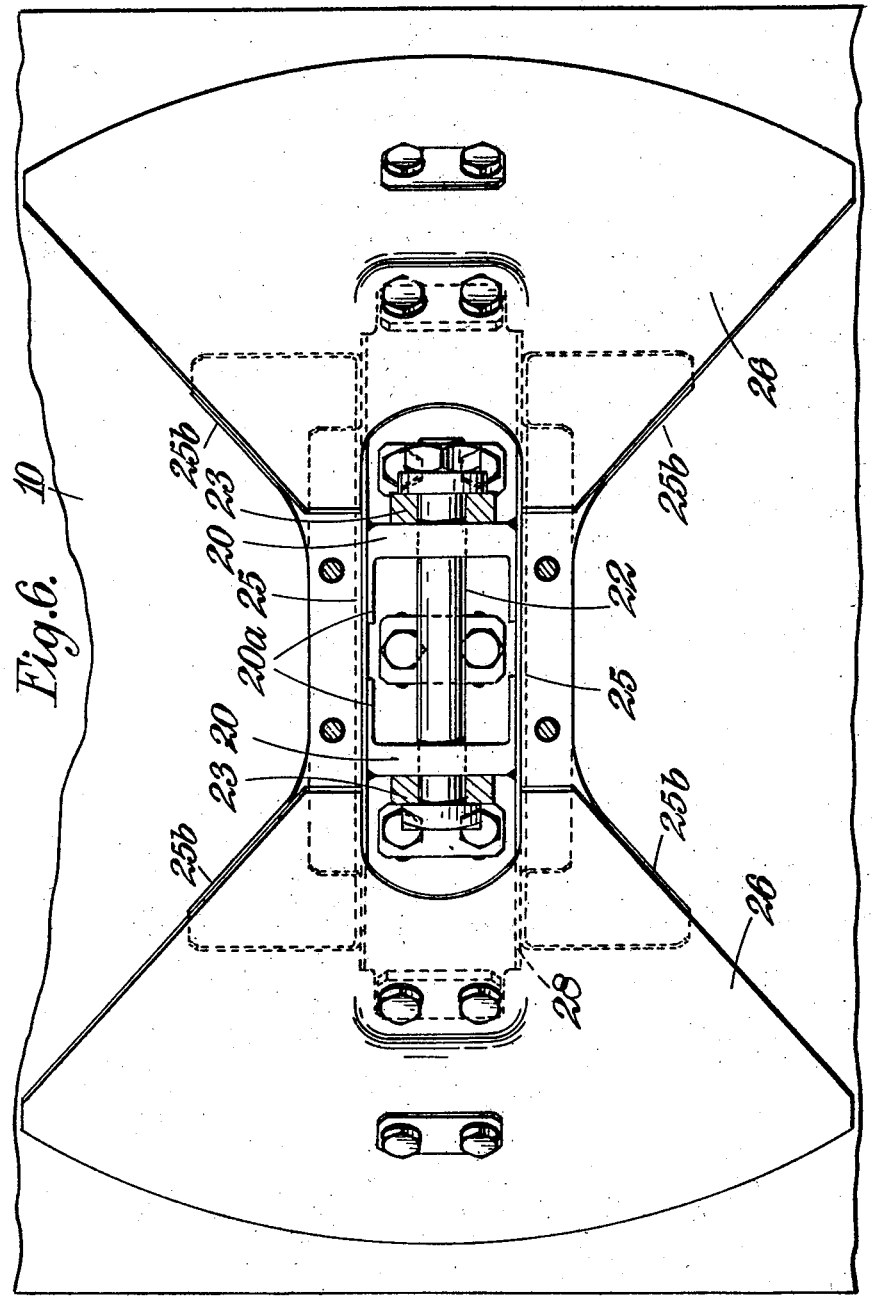

United States Patent Office 2,818,225
Patented Dec. 31, 1957

2,818,225

POWER PLANT INSTALLATIONS FOR AIRCRAFT

Nelson Hector Kent, Allestree, England, assignor to Rolls-Royce Limited, Derby, England, a British company Application March 15, 1954, Serial No. 416,294

4 Claims. (Cl. 244—54)

This invention relates to power-plant installations for aircraft of the kind (hereinafter referred to as the kind specified) wherein an engine is supported at the tip of a wing or other aerofoil surface or at the end of a strut projecting from the surface of an aircraft wing or fuselage. The latter type of mounting is known as a pod mounting.

The invention has an important use in supporting gas-turbine engine power plants from aircraft structures.

According to the present invention, in a power-plant installation of the kind described, the engine comprises a casing forming an integral structural part of the engine and having a substantially smooth, streamlined outer surface, and there is provided means to connect the engine to the aircraft structure at a pair of axially-spaced connection points lying on the same side of the casing and substantially in the same axial plane, which connecting means comprises at one of said points a pivot connection having a pivot axis at right angles to but offset from the axis of the engine and at the second point means to restrain rocking of the engine relative to the aircraft structure about the axis of said pivot connection.

In a preferred arrangement, the means to restrain rocking of the engine about the pivot axis comprises a pin with its axis substantially parallel to the engine axis, and the connecting means are substantially symmetrical about the axial plane.

Usually, the engine will have its axis arranged in the fore and aft direction and, in this case, the rearmost point of connection is preferably that having the pivot axis at right angles to the axis of the engine.

One embodiment of this invention will be described with reference to the accompanying drawings, in which:

Figure 1 shows a power-plant installation,

Figure 2 shows the connecting means to a larger scale,

Figure 3 is a section on the line 3—3 of Figure 2,

Figure 4 is a section on the line 4—4 of Figure 3,

Figure 5 is a section on the line 5—5 of Figure 1, with parts broken away or omitted for clarity, Figure 6 is a section on the line 6—6 of Figure 5, and Figure 7 is a section on the line 7—7 of Figure 5.

Referring to Figure 1, the power-plant installation comprises a gas-turbine engine including a casing 10 forming a structural part of the engine and having a substantially smooth external cylindrical surface. The casing 10 may, as shown, be formed in a number of sections, e. g. in a number of substantially cylindrical sections which abut end-to-end and are secured together. The axis of the cylindrical sections will usually coincide with the rotational axis of the engine.

The engine is secured to an aircraft wing, fin, tailplane, or pod strut (indicated at 11) by connecting means including lugs provided on one side of the casing and co-operating for example (as described below) with corresponding lugs on the aerofoil or pod strut 11. The connecting means are symmetrical about a plane through the axis of the casing.

The lugs of the connecting means are in two sets, a forward set 12 and a rear set 13 which is axially-spaced rearwardly from but axially aligned with the forward rod set 12.

The forward set 12 comprises (Figures 2, 3 and 4) a pair of axially-spaced lugs 14, 15, each of which lies in a plane at right angles to the axis of the casing, and these lugs have aligned holes in them to receive a pin 16, the axes of the holes being parallel to the axis of the casing. The pin 16, when the engine is in position, also passes through a hole in a lug 17 which extends from the end of, say, a spar 18 or the like forming a structural element of the aerofoil or pod strut 11, and the lug 17 fits between the pair of lugs 14, 15. The pin 16 is locked in position, for example by one end of the pin being circumferentially grooved, as indicated at 16a, to be engaged by a locking wire 19 which also engages with a transverse groove 14a in a base portion of the lug 14, the ends of the locking wire 19 being bent over to lie one on each side of the base portion (Figure 3).

The casing 10 of the engine on which the lugs, 14, 15, are formed will be suitably reinforced internally to take the stresses associated with the mounting lugs 15, 15; alternatively this portion of the casing may be formed integral with the front bearing housing of the engine and the support struts which extend across the air intake duct between the bearing housing and the casing.

The rear set 13 comprises (Figures 2, 5, 6 and 7) a pair of circumferentially-spaced lugs 20, welded to the outside of the casing 10 to lie in substantially axial planes. The lugs 20 have aligned holes therein, the axis of which is substantially tangential to the circumference of the casing 10, to receive a pivot pin 22 say in the form of a bolt. The pin 22 also engages holes in a pair of lugs 23 which project from the end of a yoke-like member 21 secured on, say, the end of a second spar 24 of the aerofoil or pod strut 11. When the power-plant is in position the yoke-like member 21 straddles the lugs 20 of the rear set.

The rear set of lugs 20 in the arrangement shown have flanges 20a welded to a channel member 28 mounted on the casing 10 and the lug structure is stiffened by channel-section reinforcing members 25. The members 25 are secured to the external surface of the cylindrical casing 10 by one flange 25a and the other flange 25b has its circumferentially-spaced ends made of increasing width and bent over towards the casing 10. The members 25 are joined together at the ends by sector-shaped pieces 26 which are secured to the casing 10.

The casing 10 is reinforced internally adjacent the lugs 20 by a circumferential hollow box-like ring structure 27, by which the stresses associated with the rear mounting lugs 20 are distributed through the engine structure.

The axis of the pivot pin 22 is at right angles to the axis of the engine casing 10 but is offset from the casing axis to be substantially tangential to the casing 10.

The pivot pin 22 of the rear mounting is substantially symmetrical with respect to the plane containing the axes of the forward pin 16 and of the engine casing. The forward and rear mountings are therefore readily faired into the aerofoil surface or the end of the pod strut, and for this purpose fairing members 29 (see Figures 1 and 5) may be provided of approximately L-section, the two flanges of the L being joined by a radius portion, one flange of the L-section being secured to the surface of the wing, fin, tailplane or pod strut 11 and the other flange being secured to the cylindrical outer casing 10 of the engine. Any connections to the engine such as fuel pipes 30 or controls will preferably be located within the space enclosed by the fairings 29. The fairings 29 may be formed with windows for access to the mounting pins 16, 22.

I claim:

1. An aircraft power-plant installation comprising aircraft structure and a gas-turbine engine which is adapted to be supported from said aircraft structure and which comprises a casing forming an integral structural part of the gas-turbine engine and having a substantially smooth streamlined outer surface, and means to connect the engine to the aircraft structure at a pair of axially-spaced connection points lying on the same side of the casing and substantially in the same axial plane, which connecting means comprises at one of said points a pair of circumferentially-spaced lugs attached directly to the engine casing and formed with aligned holes and at least one co-operating member attached directly to the aircraft structure and having a hole therein aligned with the holes in said lugs and pivot member to pass through the aligned holes in the lugs and the co-operating member and to be substantially tangential to the engine casing, and at the second point at least one lug attached directly to the engine casing and at least one lug on the aircraft structure to co-operate with the lug on the casing, there being aligned holes in the lugs extending substantially parallel to the axis of the engine, and a pin to pass through said holes.

2. An aircraft power-plant installation as claimed in claim 1, wherein the said co-operating member is a yoke-like part having its ends formed as lugs, said yoke-like part being adapted to straddle the circumferentially-spaced lugs on the casing, there being holes in the lugs of the yoke-like part aligned with those in the circumferentially-spaced lugs on the casing, the pivot member extending through the holes and being substantially tangential to the engine casing.

3. An aircraft power-plant installation as claimed in claim 1, comprising at said second point a pair of axially-spaced lugs on the engine casing and a lug on the aircraft structure to project between the lugs on the casing, said pin being engaged in aligned axial holes in the lugs.

4. An aircraft power-plant installation comprising aircraft structure and a gas-turbine engine which is adapted to be supported from said aircraft structure and which comprises a casing forming an integral structural part of the gas-turbine engine and having a substantially smooth streamlined outer surface, and means connecting the engine to the aircraft structure at a pair of axially-spaced connection points lying on the same side of the casing and substantially in the same axial plane, which connecting means comprises at one of said points first lug means attached directly to the engine casing and cooperating lug means attached directly to the aircraft structure, said first lug means and said cooperating lug means being side by side circumferentially of the engine casing and having aligned holes therein, the axis of the holes being substantially tangential to the engine casing, and a pivot member engaging the aligned holes and pivotally connecting the first lug means to the cooperating lug means, and which connecting means comprises at the other of said points at least one lug on the aircraft structure to cooperate with the lug on the engine casing, there being aligned holes in the lugs extending substantially parallel to the axis of the engine and a pin passing through said holes and connecting the lugs together.

References Cited in the file of this patent

UNITED STATES PATENTS

| | | |
|---|---|---|
| 2,369,344 | Ehmann | Feb. 13, 1945 |
| 2,400,248 | Morgan | May 14, 1946 |
| 2,426,537 | Van Dorn | Aug. 26, 1947 |
| 2,587,345 | Lombard | Feb. 26, 1952 |